United States Patent [19]
Miller

[11] 3,923,044
[45] Dec. 2, 1975

[54] EYE LID BLINKER

[76] Inventor: David Miller, 5 Bridge St., Watertown, Mass. 02172

[22] Filed: Jan. 24, 1975

[21] Appl. No.: 544,001

Related U.S. Application Data

[63] Continuation-in-part of Ser. No. 490,301, July 22, 1974, abandoned.

[52] U.S. Cl............................. 128/25 A; 128/76.5
[51] Int. Cl.²...................... A61H 1/02; A61H 5/00
[58] Field of Search........ 128/24 R, 25 R, 25 A, 76, 128/76.5; 3/13

[56] References Cited
UNITED STATES PATENTS

| | | | |
|---|---|---|---|
| 497,052 | 5/1893 | Lamb................................. | 128/76.5 |
| 3,602,217 | 8/1971 | Felton............................... | 128/25 A |
| 3,710,788 | 1/1973 | Reeves.............................. | 128/76.5 |

Primary Examiner—Lawrence W. Trapp
Attorney, Agent, or Firm—Wolf, Greenfield & Sacks

[57] ABSTRACT

The device may be mounted to an eye glass frame and has a small arm, the end of which is suitably attached to the upper eye lid. The arm is actuated by a cable mechanism which is in turn operated by a battery-powered solenoid. A pacing circuit, including an oscillator, controls the operation of the solenoid to simulate a normal blinking rate for the non-blinking eye.

13 Claims, 8 Drawing Figures

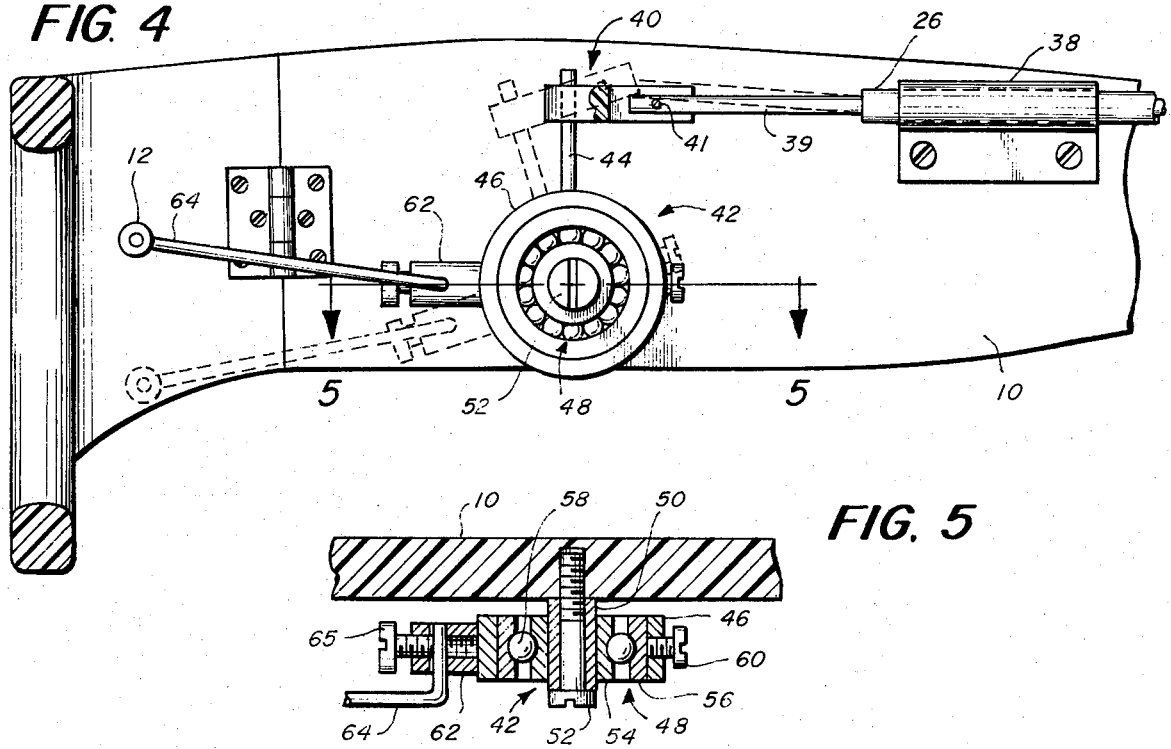
FIG. 4
FIG. 5
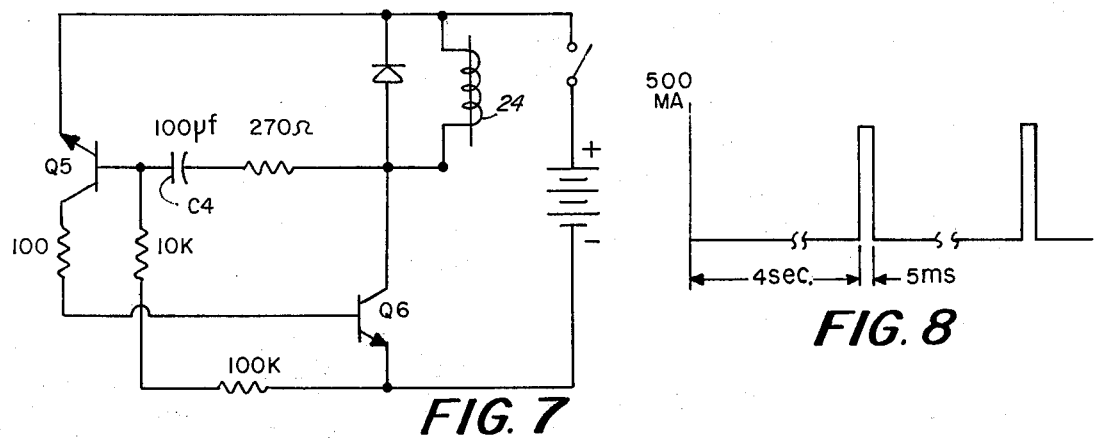
FIG. 6
FIG. 7
FIG. 8

EYE LID BLINKER

RELATED APPLICATION

This application is a continuation-in-part of applicant's copending U.S. abandoned patent application Ser. No. 490,301 filed July 22, 1974.

BACKGROUND OF THE INVENTION

The present invention relates, in general, to an eye lid blinker and pertains, more particularly, to an electromechanically operated eye lid closure device.

The normal blinking of a person occurs at a rate of about 6-10 blinks per minute. Under control of the brain, the blinking spreads and circulates conjunctival mucus over the corneal surface. The mucus converts the normally hydrophobic corneal surface into a hydrophillic surface which then allows tears to spread evenly, maintaining a moist environment. If the tears cannot wet the cornea, the corneal surface drys, then ulcerates, eventually causing corneal opacity and blindness.

The orbicularis muscle of the eye lid is responsible for lid closure or blinking. The orbicularis muscle is controlled by the seventh nerve or the facial nerve. This nerve leaves the brain, crosses the territory of the inner ear and surfaces under the skin on the side of the face.

The following conditions may affect the function of the seventh nerve: Bell's Palsy, which is an inflammation of the nerve in the area of the inner ear; Otitis Media; a trauma to the side of the face; Nerve inflammations (herpes zoster); and Brain tumors, affecting the seventh nerve (e.g. Acoustic Neuroma).

There presently exist methods of preserving the eye until the nerve function can be restored. These techniques include the use of an eye patch, to maintain the eye closed, or suturing the eye lids, or using a scleral lens. Another technique that has been used involves minor surgery in placing a spring, which functions similarly to a safety pin, into the lids to work against normal muscles which open the eye. Although this surgical technique may be sometimes successful, it may also cause a distortion of the eye lid or may erode through the eye lid.

Accordingly, it is an object of the present invention to provide a solution to this problem by employing an electromechanical eye lid closure device.

A further object of the present invention is to provide an active eye lid blinker device that can be positioned to contact the upper eye lid for causing a blinking or closure thereof at a normal blinking rate.

Still another object of the present invention is to provide an eye lid blinker device that comprises a mechanical arm attached to the upper eye lid for causing blinking thereof at a rate determined by an electrical oscillator circuit.

SUMMARY OF THE INVENTION

To accomplish the foregoing and other objects of this invention, the device for causing blinking of the upper eye lid generally comprises an arm attached at its free end to the upper eye lid. This arm may be fastened to the eye lid in any suitable manner, such as by using an adhesive. Means are provided for supporting the arm preferably for movement in an arc with the arm being moved downwardly to cause closure of the upper eye lid. The arm and supporting means for the arm are in turn supported adjacent the non-blinking eye, preferably by means of an eye glass type frame structure. Electromechanical means control the operation of the arm and include an oscillator and means responsive to the frequency of operation of the oscillator for operating the arm to close the eye lid at a predetermined frequency in the range of normal blinking rates such as at a rate of 6-10 cycles or blinks per minute.

BRIEF DESCRIPTION OF THE DRAWINGS

Numerous other objects, features and advantages of the invention should now become apparent upon the reading of the following detailed description taken in conjunction with the drawings, in which:

FIG. 4 is a cross-sectional view taken along line 4—4 of FIG. 3;

FIG. 5 is a cross-sectional view taken along line 5—5 of FIG. 4;

FIG. 6 shows one circuit embodiment for the electronics of this invention;

FIG. 7 shows an alternate embodiment for the electronics of this invention; and

FIG. 8 is a wave form associated with the circuit shown in FIG. 7.

DETAILED DESCRIPTION

Figure 1:
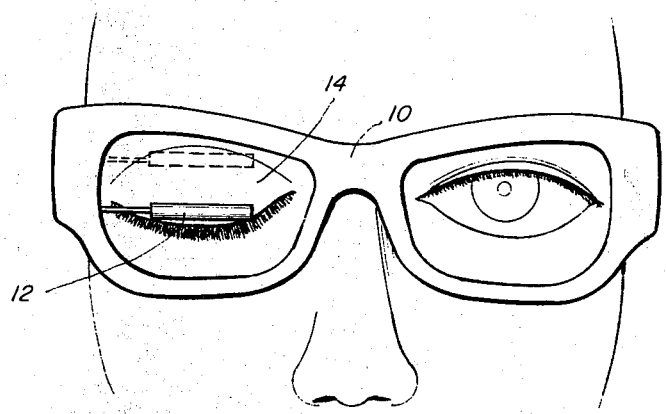
FIG. 1 shows the device of the present invention in operative position on a patient.

A device for causing a blinking of the upper eye lid is shown in FIG. 1 as being supported from an eye glass frame 10. The frame 10 preferably does not have any glass contained therein. FIG. 1 shows the arm pad 12 fastened to the edge of the upper eye lid 14. In FIG. 1 the arm pad 12 is shown in the position with the upper eye lid closed. There is also shown, in dotted, the position of the arm pad when the lid returns to its open position. The arm pad 12 is powered to only close the eye lid as it is the eye lid closure that is impaired. The eye lid muscle will return the eye lid to its open position carrying the arm pad therewith.

Figure 2:
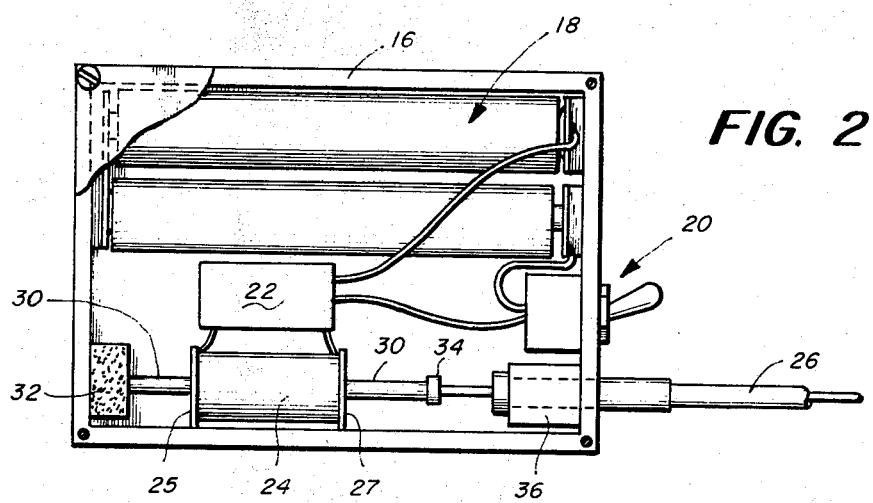
FIG. 2 shows the electro mechanical portion of the device of this invention.

FIG. 2 shows a housing 16 which may be provided with a cover, which is not shown in FIG. 2. Inside of the housing 16 there is disposed a pair of batteries 18, an on-off toggle switch 20, an electronic section 22, a solenoid 24 and an actuating cable 26. Two different embodiments for the electronics 22 are shown and discussed in more detail hereinafter with reference to FIGS. 6 and 7. The toggle switch 20 couples to the batteries 18 and also to the electronics 22 and couples or uncouples the battery power to the electronics unit. The pulse output from electronics 22 couples to solenoid 24. The solenoid 24 is supported at either end by brackets 25 and 27. The solenoid 24 has an actuating plunger 30 that extends therethrough. In FIG. 2 the solenoid 24 is shown in its de-energized position with one end contacting the shock absorber pad 32 and the other end contacting or proximate to the cable plunger 34 which is fastened to one end of the cable 26. The cable 26 is secured at that end in a cable guide block 36 which maintains the outer portion of the cable in fixed position but permits the inner portion of the cable to be easily moved upon energization of the solenoid 24.

Figure 3:
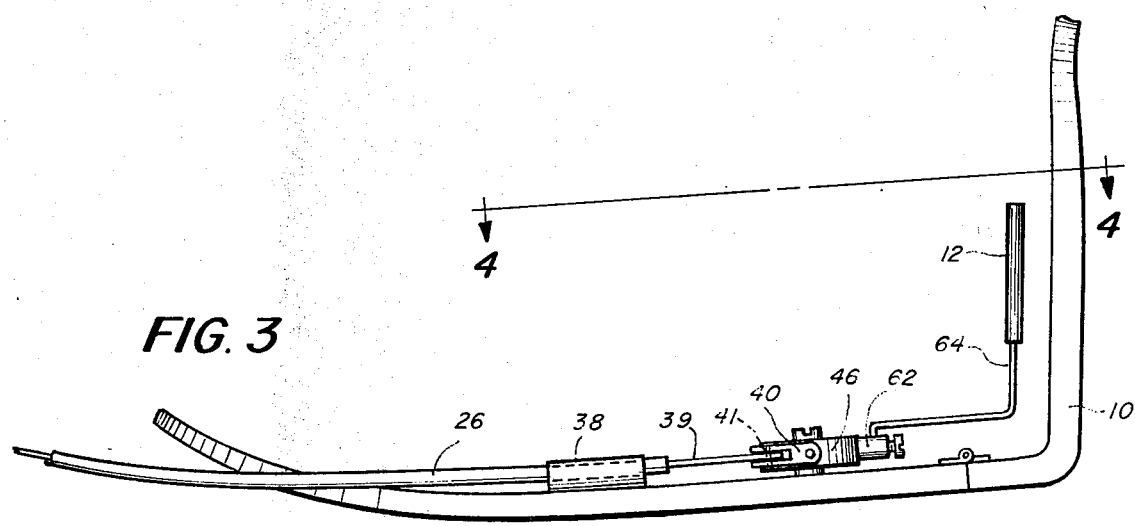
FIG. 3 is a fragmentary plan view showing the portion of the device that connects to the supporting frame.

FIG. 3 shows the other end of cable 26 with its outer section clamped by means of clamp 38. The movable portion of the clamp 26 is shown at end 39 coupling to a U-link 40. FIG. 4 also shows, in a somewhat enlarged view the clamp 38 and Ulink 40. The cable end 39 connects to the U-link by means of a pin 41. The U-link 40 connects to the arm support structure 42 by means of a post 44 which extends through an accommodating passage in the U-link as most clearly shown in FIG. 4.

Referring now to FIGS. 4 and 5, the arm support structure 42 generally comprises an outer annular casing 46, a bearing 48, a sleeve 50 and attaching screw 52. The bearing 48 includes an inner race 54, an outer race 56 and a series of spacedly disposed balls 58 as indicated in FIG. 5. The arm support structure 42 is fastened together and held in place by means of a clamping screw 60 which extends through and is threaded in the outer annular casing and bears against the outer race 56.

As indicated in FIG. 4, the post 44 also couples preferably by welding or soldering to the outer surface of casing 46. An arm support post 62 extends from casing 46 at a position opposite clamping screw 60 and has arm 66 extending therefrom. The arm 64 extends through an aperture in post 62 and is held in position as shown in FIG. 5 by a set screw 65. The set screw 65 may be loosened to change the position of that end of arm 64 to some slight extent. Also, the arm 64 is constructed of a relatively easily bendable wire which makes it relatively easy to adapt the pad 12 at the opposite end of wire 64 to the particular eye lid of the patient.

The arm support structure 42 is secured to the frame 10 as shown in FIG. 5 by means of the screw 52 and the bearing 48 is spaced at a predetermined distance from the frame 10 by means of the sleeve 50.

In FIG. 4 the arm support structure 42 is shown in solid outline in the unblinked position with the pad 12 in its up position. FIG. 4 also shows, in dotted, the position of the structure 42 when the cable 26 has been operated from the electromechanical mechanism shown in FIG. 2.

In FIG. 2 there is shown the electronics 22. One embodiment for the electronics is shown in FIG. 6. The circuit shown in FIG. 6 is basically of conventional design and connects to the battery 18. The circuit comprises an oscillator section 68 including a silicon controlled rectifier (SCR) 60 and capacitor C1. The SCR typically has a plurality of resistors associated therewith for biasing the device and the output from this section of the circuit is taken at the cathode of the SCR. This output is a pulse output at a repetition rate which is variable by means of potentiometer R5. The potentiometer R5 in effect varies the wink rate.

The pulse signal is coupled from the oscillator section 68 to the pulse width section 70 which comprises transistors Q1 and Q2, capacitor C2 and resistor R7. Periodically, when an eye lid closure or blinking is to occur transistor Q1 is caused to conduct by an impulse coupled to its base electrode. The output from transistor Q1 therefore goes to a lower voltage level causing transistor Q2 to cease conduction for a period of time determined by the values of capacitor C2 and resistor R7. In FIG. 6 resistor R7 is shown as a fixed resistance. However, this could be replaced by a potentiometer for the purpose of varying the energization time of the solenoid 24.

The circuit shown in FIG. 6 also includes an output section 72 which comprises transistors Q3 and Q4 and solenoid 24. When transistor Q2 ceases conduction power is provided by way of resistors R8 and R10 to turn on transistors Q3 and Q4 thereby energizing solenoid 24 for a period of time dependent upon the time constant of capacitor C2 and resistor R7.

The blink rate as previously mentioned is determined by the setting of potentiometer R5. The preferable frequency range settable by this potentiometer is from three to twelve pulses per minute. The duration of each pulse which may be set by resistor R7 may be on the order of 5 miliseconds. Although the blink rate is critical the blink duration is not quite as critical because the pulse has to be long enough only to cause an eye lid closure. The opening of the eye lid is caused by the eye lid muscle itself.

FIG. 7 shows another embodiment for the circuit of this invention which is somewhat simpler than the embodiment shown in FIG. 6. FIG. 7 comprises a conventional astable multivibrator which functions as an oscillator and comprises transistors Q5 and Q6, associated resistors and capacitor C4. This circuit is coupled to the battery 18 and functions in a well known manner to provide an output as shown in FIG. 8. This output indicates that a pulse is received every four seconds which is a somewhat high blink rate, and each pulse has a duration of five miliseconds. Although the electrical pulse output which causes operation of the solenoid has a duration of five miliseconds the eye lid itself typically has a duration of closure on the order of one-third to one-half a second.

Referring again to FIGS. 1–5, it can be seen that when the solenoid 24 is energized, its output plugner strikes the cable plunger 34 causing the movable section of the cable 26 to move the structure 42 in a counterclockwise direction as viewed in FIG. 4. This in turn causes the arm 64 to move downwardly in turn causing an eye lid closure. The pad 12 is fastened to the upper eye lid preferably close to the eye lash by either using a spray-on medical adhesive or the adhesive used to apply false eye lashes.

Having described a limited number of embodiments of the present invention it should now become apparent that numerous other embodiments and modifications thereof are contemplated as falling within the spirit and scope of the present invention. For example, an eye glass frame has been disclosed for supporting the blinker mechanism but a frame of this type need not be used but may be replaced by any other type of supporting structure for positioning the mechanism adjacent to the eye. Also, in FIGS. 6 and 7 there has been shown two circuits. Obviously, other oscillator circuits could be substituted therefor.

Although the arm 64 has been described as being mechanically attached to the upper eye lid, the attachment can be through magnetic means where the arm is coupled to the lid without mechanical attachment. For example, arm 64 can carry a magnet or magnetic material in the position of pad 12 and a magnet or magnetic material can be attached onto or embedded in the eye lid. Movement of the arm 64 then causes movement of the eye lid through either magnetic attraction or repelling of two magnets or a magnet and a ferrous material. The magnet used in the arm could be an electromagnet which could be energized during suitable periods of movement of the arm. In some cases where the arm is designed to provide lid movement by magnetic means, the arm can be spaced from the lid so that no direct contact of the arm with the lid or any direct attachment thereof occurs although the magnetic field is great enough to cause eye lid movement in response to arm movement.

What is claimed is:

1. An apparatus for blinking or closing the eye lid comprising:
   arm means attachable to the eye lid,
   means for holding said arm means for movement at least downwardly to cause closure of said eye lid,
   means for supporting and positioning said arm means and holding means for said arm means adjacent the eye,
   and electromechanical means including an oscillator and means responsive to the frequency of operation of said oscillator for operating said arm to close the eye lid at a predetermined frequency in the range of normal blinking rates.

2. The apparatus of claim 1 wherein said electromechanical means includes means responsive to pulses from the oscillator and including a cable means coupling to the holding means for the arm means.

3. The apparatus of claim 2 wherein said cable means is of sufficient length to permit at least part of said electromechanical means to be disposed remote from the eye.

4. The apparatus of claim 2 wherein said arm means has a pad which is adhesively fixed to the upper eye lid.

5. The apparatus of claim 4 wherein said means responsive to the oscillator includes a solenoid having an actuating plunger.

6. The apparatus of claim 4 wherein said means for supporting includes an eye glass frame.

7. The apparatus of claim 6 wherein said means for holding comprises a rotatable arm support structure including a casing, a support pivot secured to the frame, bearing means disposed intermediate the support pivot and casing, means for fastening the arm means to the casing and means extending from the casing for attaching the cable means thereto.

8. The apparatus of claim 4 including means for adjusting the position of said arm means.

9. A device for blinking or closing the eye lid comprising means attachable to the eye lid and being supported for movement to cause closure of the eye lid and means for operating the means attachable to the eye lid at a normal blinking rate.

10. The device of claim 9 wherein the blinking rate is in the range of 3–15 blinks per minute.

11. An apparatus in accordance with claim 1 wherein said arm means is attached to said eye lid by magnetic engagement.

12. A device for blinking or closing the eye lid, comprising means for applying a blinking force to said eye lid, said means for applying being supported in operative relation to said eye lid,
    and means for operating said means for applying at a predetermined blinking rate.

13. A device in accordance with claim 12 wherein said means for applying is supported by a frame and comprises a magnet.

* * * * *